United States Patent [19]
Shonai et al.

[11] Patent Number: 5,383,532
[45] Date of Patent: Jan. 24, 1995

[54] FOOT PEDAL LOCKING DEVICE FOR CARGO-HANDLING VEHICLE

[75] Inventors: Masami Shonai; Yasuhiro Torii; Kohji Iwamura, all of Kariya, Japan

[73] Assignee: Kabushiki Kaisha Toyoda Jidoshokki Seisakusho, Kariya, Japan

[21] Appl. No.: 851,653

[22] Filed: Mar. 16, 1992

[30] Foreign Application Priority Data

Mar. 18, 1991 [JP] Japan ............... 3-052836

[51] Int. Cl.⁶ ............................... B60R 21/00
[52] U.S. Cl. .......................... 180/269; 180/271
[58] Field of Search .................. 180/6.48, 271, 272, 180/273, 268, 269, 286, 287, 289; 280/748, 751, 753; 49/394; 104/241; 105/276, 308.1; 192/129 R; 410/134, 143, 152; 414/480, 699; 297/487, 488

[56] References Cited

U.S. PATENT DOCUMENTS

| | | | |
|---|---|---|---|
| 3,808,592 | 4/1974 | Wright | 180/269 |
| 3,860,904 | 1/1975 | Anderson | 180/269 |
| 3,912,939 | 10/1975 | Quantz et al. | 180/269 |
| 3,939,939 | 2/1976 | Okazaki | 180/269 |
| 3,987,864 | 10/1976 | Iijima et al. | 180/269 |
| 4,388,980 | 6/1983 | Vig et al. | |
| 4,391,344 | 7/1983 | Weber et al. | |
| 4,397,371 | 8/1983 | Lynnes et al. | |
| 5,036,962 | 8/1991 | Amagasa | 180/271 |
| 5,100,173 | 3/1992 | Kudler | 180/271 |

Primary Examiner—Stephen P. Avila
Attorney, Agent, or Firm—Brooks Haidt Haffner & Delahunty

[57] ABSTRACT

A foot pedal locking device for cargo-handling vehicles, for preventing cargo-handling equipment of the vehicle from starting if an operator accidentally steps on a foot pedal when getting off the vehicle. An operating means, when operated by the operator, works to move a restricting means on the basis of a detection signal from a detecting means for detecting the state of utilization of the cargo-handling vehicle, thus locking or unlocking the foot pedal. Furthermore, the foot pedal locking device has a restraining means which can be switched between a restraining position where the operator occupying a seat is restrained and a waiting position where the restraining means does not interfere with the operator when he gets on or off the seat. With the switching operation of this restraining means from the restraining position to the waiting position, a lock control means forcibly operates the restricting means regardless of the operation of the operating means, thereby locking the rotation of the foot pedal.

20 Claims, 9 Drawing Sheets

FOOT PEDAL LOCKING DEVICE FOR CARGO-HANDLING VEHICLE

BACKGROUND OF THE INVENTION

1. Field of the Invention

The present invention relates to a foot pedal locking device for a cargo-handling vehicle such as shovel loaders and fork-lift trucks.

2. Description of the Related Art

In conventional cargo-handling vehicles such as a four-wheel drive small-type shovel loader, an operator is likely to accidentally step on a foot pedal when getting into or out of an operator compartment at an entrance located at the front of the vehicle. If a lift-arm operating pedal is accidentally depressed, the lift arm of the shovel loader is lowered. Similarly, if a vehicle drive pedal is depressed, the vehicle starts to move. In order to prevent such accidents, a locking device for preventing a foot pedal from rotating, i.e. pivoting, has been disclosed in U.S. Pat. No. 4,397,371.

In this locking device, a lock member is spring-loaded to be able to move up and down. Usually, the lock member is held in an up position by the spring. At the lower end of the lock member is fixedly attached a control link, for preventing the operation of a fluid control device and the rotation of the foot pedal. In this case, there is provided a seat bar (a restraining means) which, when turned to an operator restraining position, pushes the aforesaid lock member against the force of the spring, thus moving the lock member down. In this state, as the control link is swingable, both the fluid control device and the foot pedal also become operable.

However, the lock member is moved upward by a spring force to fix the control link for the purpose of locking the fluid control device and the foot pedal; if the spring force is too weak to raise the lock member, the lock member cannot be moved upward to fix the control link. Therefore, increasing the spring force may be considered; if, however, the spring force is increased, the seat bar will require a greater force to move the lock member downward, possibly degrading unlocking quality.

Also, if the spring, the lock member and the control link get rusty, or if there is present a pebble or sand in the fixing part where the control link is secured to the lock member, the lock member is difficult to be smoothly moved, with the result that the fixing of the control link, the locking of the operation of the fluid control device and the locking of the foot pedal will become unreliable.

Other similar prior art techniques have also been proposed in U.S. Pat. Nos. 4,388,980 and 4,391,344.

SUMMARY OF THE INVENTION

The present invention has been accomplished in an attempt to solve the problems mentioned above and has as its object the provision of a foot pedal locking device for cargo-handling vehicles, which is capable of reliably locking a cargo handling foot pedal and a vehicle driving foot pedal so that the cargo-handling equipment or the like will never accidentally operate and so that the vehicle will never accidentally start to run.

In order to solve the above-mentioned problems, the locking device of the present invention is designed such that, when operated by the operator, a detecting means of the locking device detects an operating condition requiring the use of the cargo-handling vehicle, and according to a signal from the detecting means an operating means moves a restricting means to lock or unlock the foot pedal. Furthermore, the locking device has a restraining means which can be switched between a restraining position in which the operator occupying the seat is restrained and a waiting position in which the restraining means will not interfere with the operator getting into and out of the operator compartment. Based on the operation of the restraining means which can be switched from the restraining position to the waiting position, the locking means forces the restricting means to operate regardless of the operation of the operating means, thus locking the foot pedal against turning.

Therefore, the seat occupant restrained in the restraining position switches the restraining means to the waiting position when getting off the vehicle. Then, the operating means connected to the restraining means operates to actuate the locking means. With the operation of this locking means, the restricting means is operated, thereby enabling turning of the foot pedal to be locked. It is, therefore, possible to prevent the operation of the vehicle or its equipment even if the foot pedal is accidentally depressed by the operator when he gets off the vehicle.

Other objects and advantages of the present invention will become apparent upon reading the attached detailed description and upon reference to the accompanying drawings.

DETAILED DESCRIPTION OF THE PREFERRED EMBODIMENT

Hereinafter an exemplary embodiment of a foot pedal locking device according to the present invention for a four-wheel drive small-type shovel loader cargo-handling vehicle will be described with reference to FIGS. 1 to 10.

Figure 1:
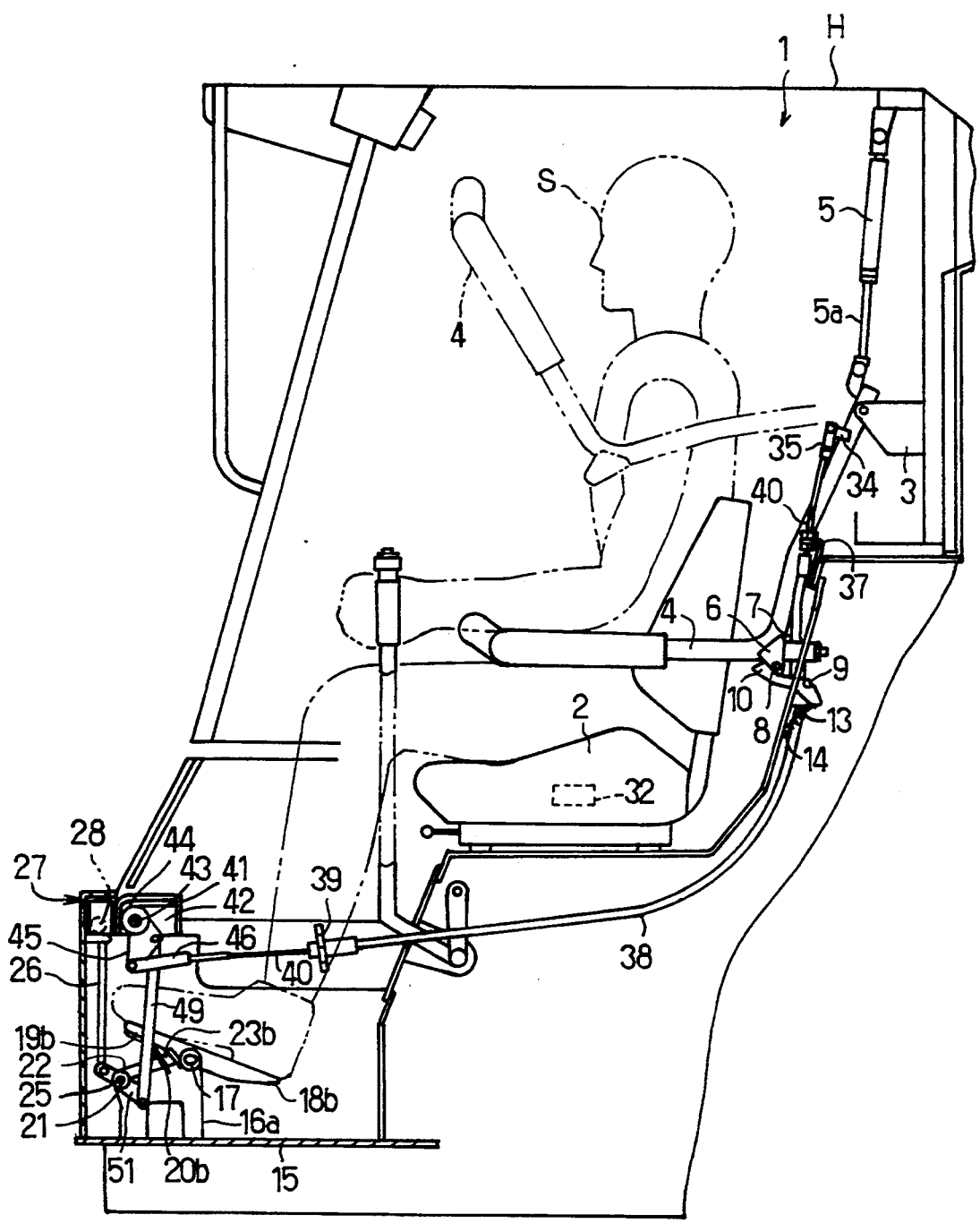
FIG. 1 is a partly enlarged side view showing an operator's seat section of a four-wheel drive small-type shovel loader of a cargo-handling vehicle according to the present invention.
Figure 7:
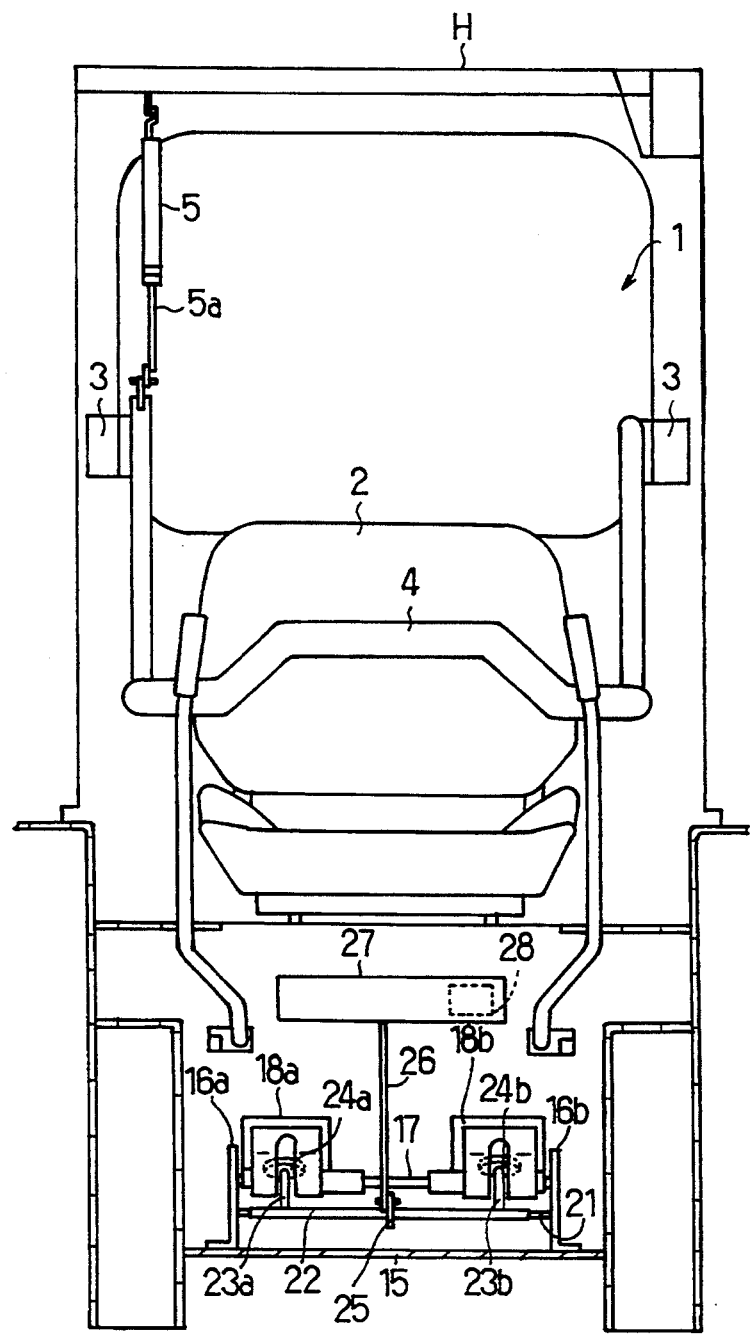
FIG. 7 is a partly enlarged front view showing the operator's seat section of the four-wheel drive small-type shovel loader.

FIGS. 1 and 7 show an operator's seat section 1 of the four-wheel drive small-type shovel loader vehicle H. The operator's seat section 1 is equipped with a seat 2 for an operator S. On the rear side of the seat 2 is rotatably supported a seat bar 4 as a restraining means, such being rotatably supported at both of its ends horizontally by a bracket 3 and bent toward the front of the vehicle, approximately in an L-shape at its central section as viewed from the side of the vehicle. This seat bar, as indicated by a solid line, is rotatable between two positions: a restraining position in which the operator S is restrained on the seat with some allowance provided, and a waiting position in which, as indicated by a two-dot chain line, the operator S will not be interfered with by the seat bar when taking or leaving the seat 1 at the front of the vehicle.

Figure 8:
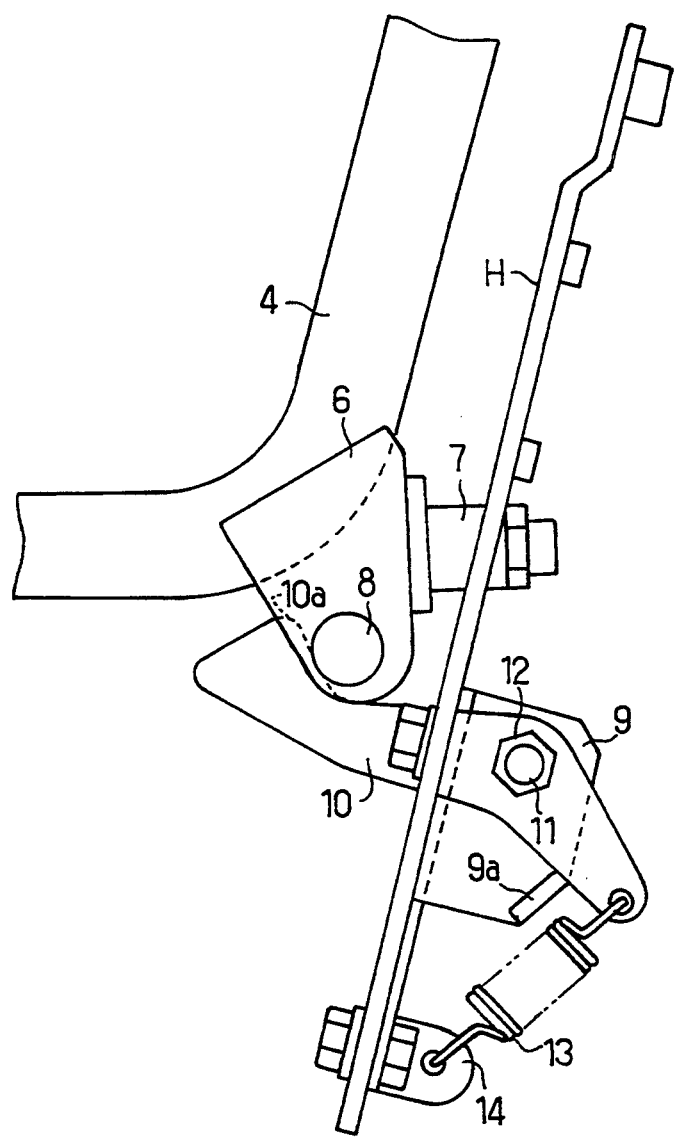
FIG. 8 is a partly enlarged side view showing the seat bar held in the operating position by means of an engaging plate and the engaging pin applied with the force of a coil spring.

To the base end section of the seat bar 4 is connected a rod 5a of a damper 5 which is a holding means connected to the vehicle H, so that the seat bar 4 will be held in the waiting position indicated by the two-dot chain line. Furthermore, as shown in FIGS. 1 and 8, a pressure piece 6 is fixedly attached to the bent section of the seat bar 4. A set switch 7 installed on the vehicle H is pressed by the side of this pressure piece 6, thereby enabling detecting whether or not the seat bar 4 has been properly set in the operating position.

Furthermore, the seat bar 4 has a holding means for holding the seat bar 4 in the restraining or operating position. As shown in FIG. 8, an engaging pin 8 is projectingly formed at the forward end of the pressure piece 6; a bracket 9 on which a restricting piece 9a is formed is fixedly attached inside of the vehicle H; and on this bracket 9 is rotatably mounted an engaging plate 10 by a bolt 11 and a nut 12. One end of the engaging plate 10 is protruding outside of the vehicle H, so that an engaging part 10a formed on the side of the engaging plate 10 is engaged with the engaging pin of the pressure piece 6. Below the bracket 9, a locking plate 14 connected to one end of a coil spring 13 is installed by tightening. The other end of the coil spring 13 is connected to the other end of the engaging plate 10. The engaging plate 10, therefore, is pulled by the coil spring 13 to turn clockwise on the center of the bolt 11, while engaging with the restricting piece 9a of the bracket 9 to restrict its rotation. Thus, the engaging part 10a of the engaging plate 10 and the engaging pin 8 are properly engaged with each other to hold the seat bar 4 stably in the operating position, and also the pressure piece 6 holds the set switch 7 in a pressed state, thereby preventing chattering.

As shown in FIGS. 1 and 7, on a toe board 15 installed at the front lower part of the seat 2 of the operator's seat section 1, a pair of mounting brackets 16a and 16b are installed in opposite positions at a predetermined space in the direction of width. And between the mounting brackets 16a and 16b is fixedly supported a support shaft 17. Also between and near these mounting brackets 16a and 16b, a pair of foot pedals 18a and 18b are inserted and supported for independent rotation. Accordingly, by depressing these foot pedals 18a and 18b, the operator S occupying the seat 2 can raise and lower the lift arm, not illustrated, and perform a dumping operation of a bucket.

Figure 9:
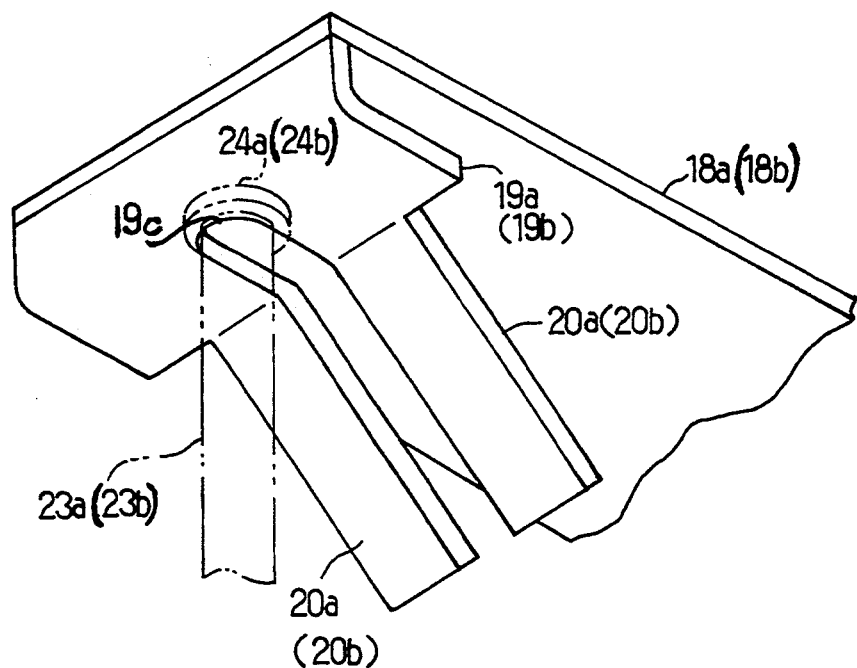
FIG. 9 is a partly cutaway perspective view showing the shape of the engaging plate and the state of the engaging pin located on the toe end on the back of the foot pedal.

Next, as shown in FIG. 9, on the back of the tip of the foot pedals 18a and 18b are installed locking plates 19a and 9b. These locking plates 19a and 19b are extended toward the rear end of the foot pedals 18a and 18b. At the front end of the locking plates 19a and 19b, bifurcated locking pawls 20a and 20b bent toward the toe board 15 are integrally formed in parallel with a predetermined space.

Between the mounting brackets 16a and 16b, a fixed shaft 21 is supported and fixed at the front lower part of the support shaft 17. On the fixed shaft 21 is rotatably supported a pipe 22; on the outside surface of this pipe 22 are fixedly installed a pair of engaging pins 23a and 23b. A pair of heads 24a and 24b of the engaging pins 23a and 23b are inserted in the locking pawls 20a and 20b of the foot pedals 18a and 18b, respectively.

The foot pedals 18a and 18b are designed to be separately operable. Upon rotation of the pipe 22, the pair of engaging pins 23a and 23b turns to lock the foot pedals 18a and 18b against turning when the heads 24a and 24b are positioned against the respective base ends 19c of the groove in each of the locking plates 19a and 19b as indicated by a two-dot chain line in FIG. 9. In the present embodiment, the restricting means comprises the locking plates 19a and 19b, pipe 22, and engaging pins 23a and 23b.

As shown in FIGS. 1 and 7, a control lever 25 is secured to the pipe 22 and an operating lever 26 is connected to the control lever 25. Furthermore, a driving device 27 is disposed at the obliquely left (in FIG. 1) of the foot pedals 18a and 18b, and the operating lever 26 is connected to the driving device 27. Inside of the driving device 27 is disposed a solenoid 28. As the solenoid 28 is energized and deenergized, the operating lever 26 moves up and down through the driving device 27, thereby causing rotation of the pair of engaging pins 23a and 23b through the control lever 25 and the pipe 22. In the present embodiment, the operating means comprises the driving device 27 and the solenoid 28.

Figure 2:
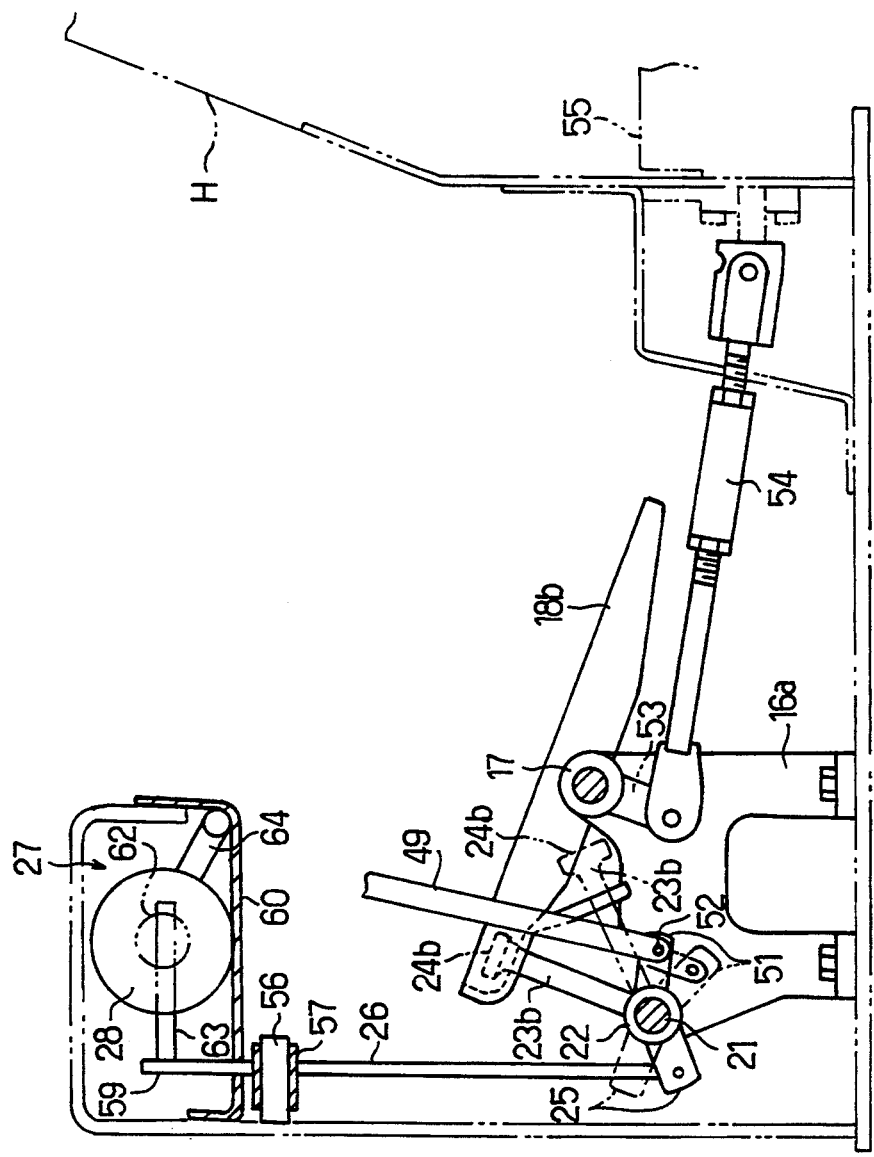
FIG. 2 is a partly enlarged side view showing the construction of an engaging pin lock for locking a foot pedal and the construction of connection of a driving apparatus for turning the engaging pin.
Figure 3:
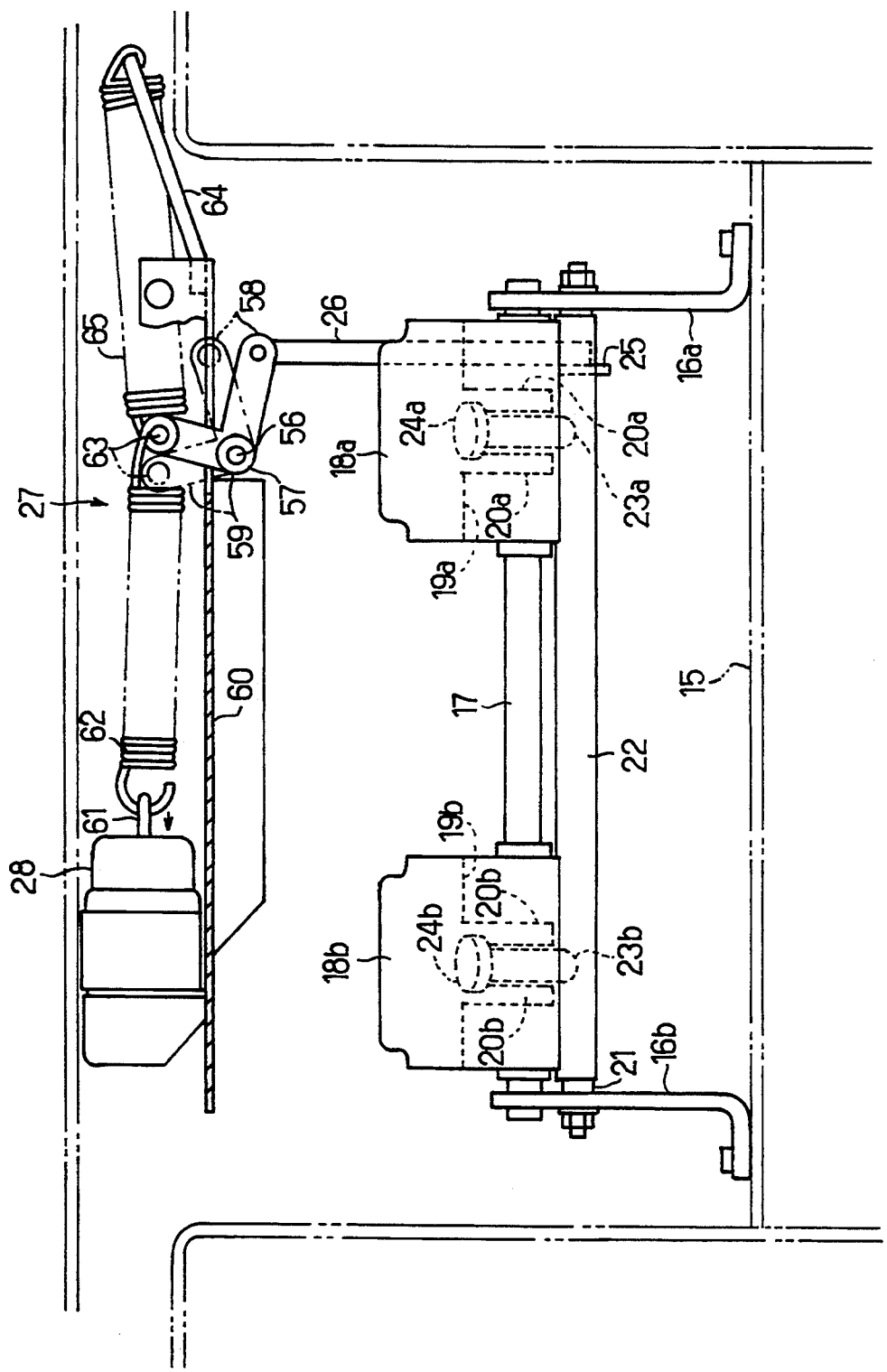
FIG. 3 is a partly enlarged front view showing the construction of the driving apparatus and a plunger for turning the engaging pin.

Next, the construction of the driving device 27 will be briefly explained. As shown in FIGS. 2 and 3, a collar 57 is rotatably supported on a support pin 56 mounted beneath the driving device 27 in the vehicle H. On the outside surface of the collar 57 are provided a connecting piece 58 extending in a horizontal direction and a link piece 59 extending upward. To the forward end of the connecting piece 58, the operating lever 26 is connected.

On the side of the vehicle H above the support pin 56 is fixedly attached a support base 60 bent into a channel-shaped cross section. On this support base 60 is fixedly installed the solenoid 28. One end of a first coil spring 62 is connected to an operating shaft 61 of the solenoid 28. The other end of the coil spring 62 is connected to a link pin 63 of the link piece 59 which projects into the driving device 27. On the end of the support base 60 is fixed one end of a connecting rod 64, and one end of a second coil spring 65 is connected to its forward end. The other end of the second coil spring 65 is connected to the link pin 63 of the link piece 59 connected to the other end of the first coil spring 62.

Then, the tension of the first coil spring 62 and that of the second coil spring 65 are balanced, so that the link piece 59 and the connecting piece 58 are held in their positions indicated by a solid line as shown in FIG. 3. At this time, the heads 24a and 24b of the engaging pins 23a and 23b mounted on the pipe 22 are positioned in the base end 19c of the locking plates 19a and 19b, thus locking the foot pedals 18a and 18b.

Next, the construction of an electric control circuit for driving and controlling the solenoid 28 will be explained.

Figure 10:
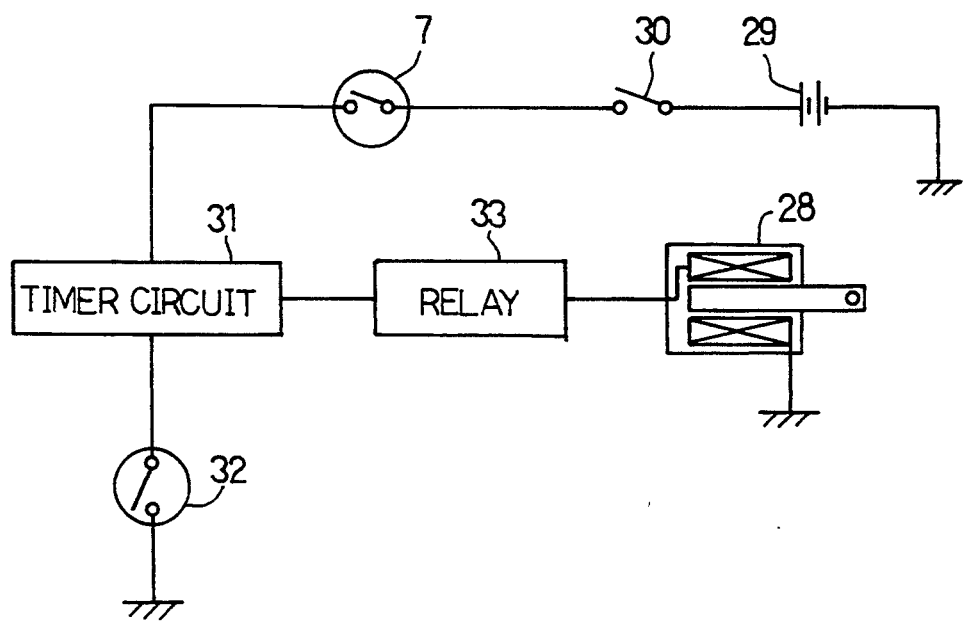
FIG. 10 is an electric circuit diagram for driving and controlling the plunger.

As shown in FIGS. 1 and 10, a power source 29 is connected in series to an ignition switch 30 as a detecting means, the set switch 7, and seat switch 32 located inside the seat 2. These switches are further connected in series to a timer circuit 31. The timer circuit 31 functions as a delay unit which nullifies an instantaneous, momentary off-state of the seat switch 32. To the timer circuit 31 is connected the solenoid 28 through a relay 33. Therefore, the solenoid 28 is energized through the relay 33 with the ignition switch 30, set switch 7 and seat switch 32 turned on. Thus, the driving device 27 operates to move the operating lever 26 upward. Consequently, the pair of engaging pins 23a and 23 turn on the center of the fixed shaft 21 to the position indicated by the solid line in FIG. 1, through the control lever 25 and the pipe 22. If any one of the switches 7, 30 and 32 is opened or turned off, the solenoid 28 is de-energized and the driving device 27 is operated to lower the operating lever 26. Therefore, the pair of engaging pins 23a and 23b turn on the center of the fixed shaft 21 to the position indicated by the two-dot chain line in FIG. 9 through the control lever 25 and the pipe 22. Consequently, the driving device 27 and the solenoid 28 are operated to turn the engaging pins 23a and 23b, thereby locking the foot pedals 18a and 18b against turning.

Figure 4:
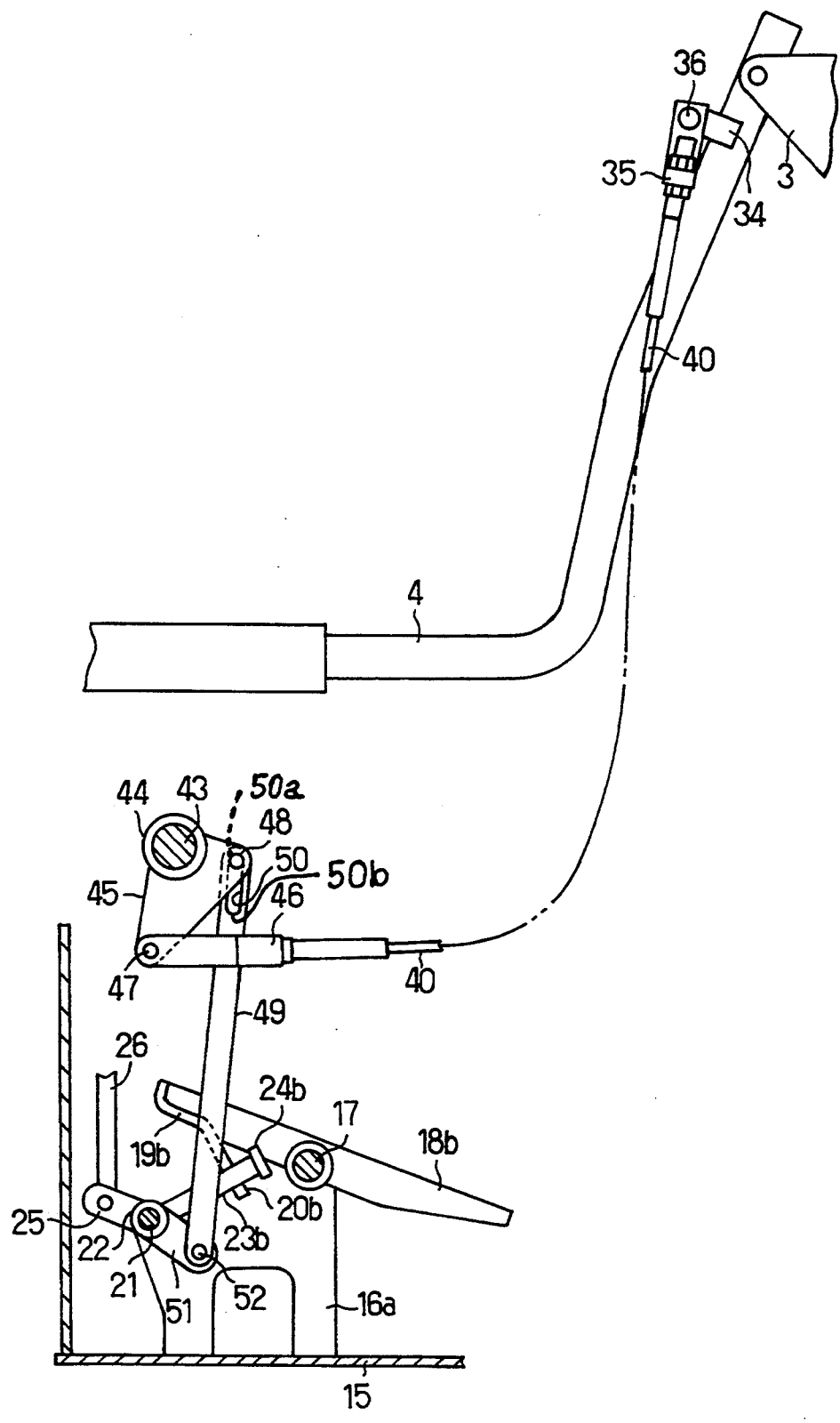
FIG. 4 is an explanatory view showing the foot pedal unlocked by the engaging pin with a seat bar turned to a restraining position.

As shown in FIGS. 1 and 4, a fixing plate 34 is present at the base end section of the seat bar 4 as a restraining means. Swingably connected to this fixing plate 34 by a pin 36 is a control rod 35. To the control rod 35 is connected one end of a rigid wire 40. Also on the vehicle body above the set switch 7 is secured a support member 37 bent in an L-shape, to which one end of a guide pipe 38 is connected and fixed. The guide pipe 38 is routed inside of the vehicle body H, with the other end being led out at the underside of the operator's seat section 1, that is, in the vicinity of the foot pedals 18a and 18b. Also, the other end of the guide pipe 38 is fixedly connected to a fixing member 39 provided on the side of the vehicle H. The wire 40 connected to the control rod 35 is inserted in the guide pipe 38 with its other end being led out to the bottom of the operator's seat section 1. In the present embodiment, the control rod 35, wire 40 and control rod 46 constitute a part of the lock control means.

Above the tips of the foot pedals 18a and 18b, a chassis 41 connected to the vehicle H is arranged in the direction of the vehicle width, and is provided with a connecting member 42. A support shaft 43 is secured to the connecting member 42. A rotating lever 45 is mounted on this support shaft 43; and at the forward end of the rotating lever 45, a control rod 46 connected to the other end of the wire 40 is rotatably connected by a pin 47.

Therefore, when the seat bar 4 is turned upwardly to the waiting position, the wire 40 is pulled upward by the fixing plate 34 and the control rod 35; and it is, therefore, possible to turn the rotating lever 45 in a counterclockwise direction by use of the control rod 46 connected at the other end to the wire 40.

On the side (the right-hand side in FIG. 4) of the rotating lever 45 is connected one end of a rocking link 49 by a connecting pin 48. The rocking link 49 has an elongated hole or slot 50 in its one end, in which the connecting pin 48 can slide so that the link 49 will function as a lost-motion device.

A link lever 51 is fixedly mounted on the outside surface of the pipe 22 which is supported on the fixed shaft 21. At the forward end of this link lever 51, the other end of the rocking link 49 is rotatably connected by a connecting pin 52. Also, when the foot pedals 18a and 18b are not locked by the engaging pins 23a and 23b as shown in FIG. 4, the connecting pin 48 comes to be positioned against the stop 50a formed by the upper end of the slot 50 of the rocking link 49. In this state, turning the rotating lever 45 counterclockwise through the wire 40 and the control rod 46 will move the rocking link 49 upward.

Furthermore, when the operating lever 26 is moved downward, from the state shown in FIG. 4, by deenergizing the solenoid 28 and the driving device 27 so that the springs 62 and 65 turn the pins 23a and 23b to thereby lock the foot pedals 18a and 18b, the rocking link 49 is moved upwardly via the pipe 22 and the link lever 51, without any movement of the pin 48 or lever 45. Consequently, it is possible to lock the foot pedals 18a and 18b by means of the engaging pins 23a and 23b according to the off-operation or opening of any of the switches 7, 30 and 32 without switching the seat bar 4 to the waiting position.

Figure 5:
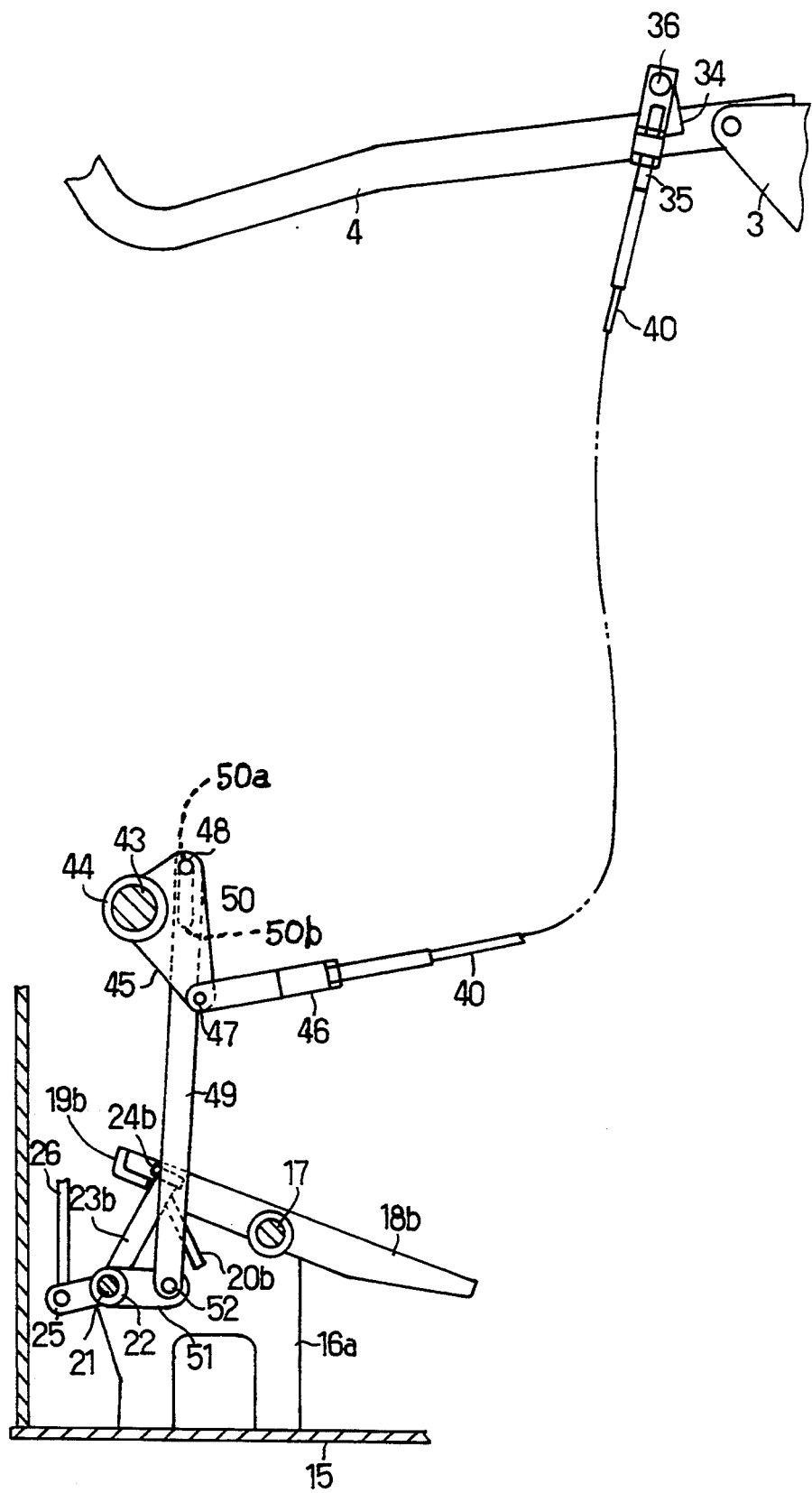
FIG. 5 is an explanatory view showing the foot pedal locked by the engaging pin with the seat bar turned to the waiting position.

When the rocking link 49 moves upward from the state shown in FIG. 4 according to the switching operation of the seat bar 4, the pipe 22 and the engaging pins 23a and 23b turn counterclockwise through the link lever 51 as shown in FIG. 5 so that the engaging pins 23a and 23b are inserted respectively into the base end 19c of the locking plates 19a and 19b to lock the foot pedals 18a and 18b. In the present embodiment, the lock mechanism of the lock control means comprises the support shaft 43, the rotating lever 45, the rocking link 49 and the link lever 51.

Furthermore, a control member 53 is provided on the back side of the foot pedals 18a and 18b as shown in FIG. 2, and one end of a connecting rod 54 is connected to the forward end thereof. The other end of the connecting rod 54 is connected to an oil control valve 55 disposed in the vehicle H.

Therefore, when the operator S uses the four-wheel drive small-type shovel loader, the seat bar 4 is turned to the waiting position as indicated by the two-dot chain line, and then, the operator S takes the seat 2. Thereafter the seat bar is turned to the restraining or operating position as indicated by solid lines, .automatically turning on the set switch 7. When the ignition switch 30 is turned on by the operator, the timer circuit 31 is operated to energize the solenoid 28 via the relay 33.

With the operation of the solenoid 28, the driving device 27 is operated to move the operating lever 26 upward; and the control lever 25 turns the pipe 22 and the engaging pins 23a and 23b clockwise on the center of the fixed shaft 21. The engaging pins 23a and 23b, therefore, turn to the position indicated by solid lines in FIG. 4. In consequence, the foot pedals 18a and 18b are free to be depressed by the operator.

The operator S, when getting off from the operator's seat section 1 after finishing the operation, will lift the seat bar 4 to the upper, waiting position, and will turn off the ignition switch 30. With the rotation of the seat bar 4, the set switch 7 is also automatically turned off. And accordingly, the timer circuit 31 stops, to de-energize the solenoid 28 via the relay 33. Thus, the driving device 27 is operated so that the springs 62 and 65 lower the operating lever 26, which in turn pushes the control lever 25 downward to turn the pipe 22 and the engaging pins 23a and 23b counterclockwise on the center of the fixed shaft 21. Consequently, the heads 24a and 24b of the engaging pins 23a and 23b are positioned respectively in the base ends 19c of the locking plates 19a and 19b as indicated by the two-dot chain line in FIG. 9, thereby locking the foot pedals 18a and 18b against turning.

If, therefore, the operator S accidentally steps on the foot pedal 18a or 18b when getting off the vehicle H at the entrance which is toward the front of the vehicle, the pedal, being locked by the engaging pin 23a or 23b is not moved, and therefore, the lift arm of the shovel loader, not illustrated, is not moved either downward or upward, and furthermore any forward or backward tilt of the bucket is prevented.

Next, the operation of the foot pedal locking device of the aforesaid construction will be explained.

When the operator S on the seat 2 sets the seat bar 4, the set switch 7 and the seat switch 32 are turned on. In this state, when the vehicle H is operated with the ignition switch 30 turned on, the engaging pins 23a and 23b are positioned on the forward ends of the locking plates 19a and 19b that is, in the position indicated by the solid line as shown in FIGS. 1 and 4. Therefore, with the rotation or pivoting of the foot pedal 18a or 18b, an oil control valve 55 indicated by a two-dot chain line in FIG. 2 is operated. In this state, the lift arm and so on mounted on the vehicle H are ready for operation.

When getting off the operator's seat section 1 after completion of operation, the operator S switches the positions of the seat bar 4 by lifting and turning the seat bar 4 from the operating position shown in FIG. 4 to the waiting position shown in FIG. 5. Thus, the set switch 7 is turned off, to thereby de-energize the solenoid 28 of the driving device 27 as shown in FIG. 3. Then, the operating shaft 63 is moved in the direction opposite to the arrow by the force of the first coil spring 62 and the second coil spring 65, thereby turning the link piece 59 and the connecting piece 58 clockwise on the center of the support pin 56 as far as the position indicated by a solid line.

Figure 6:
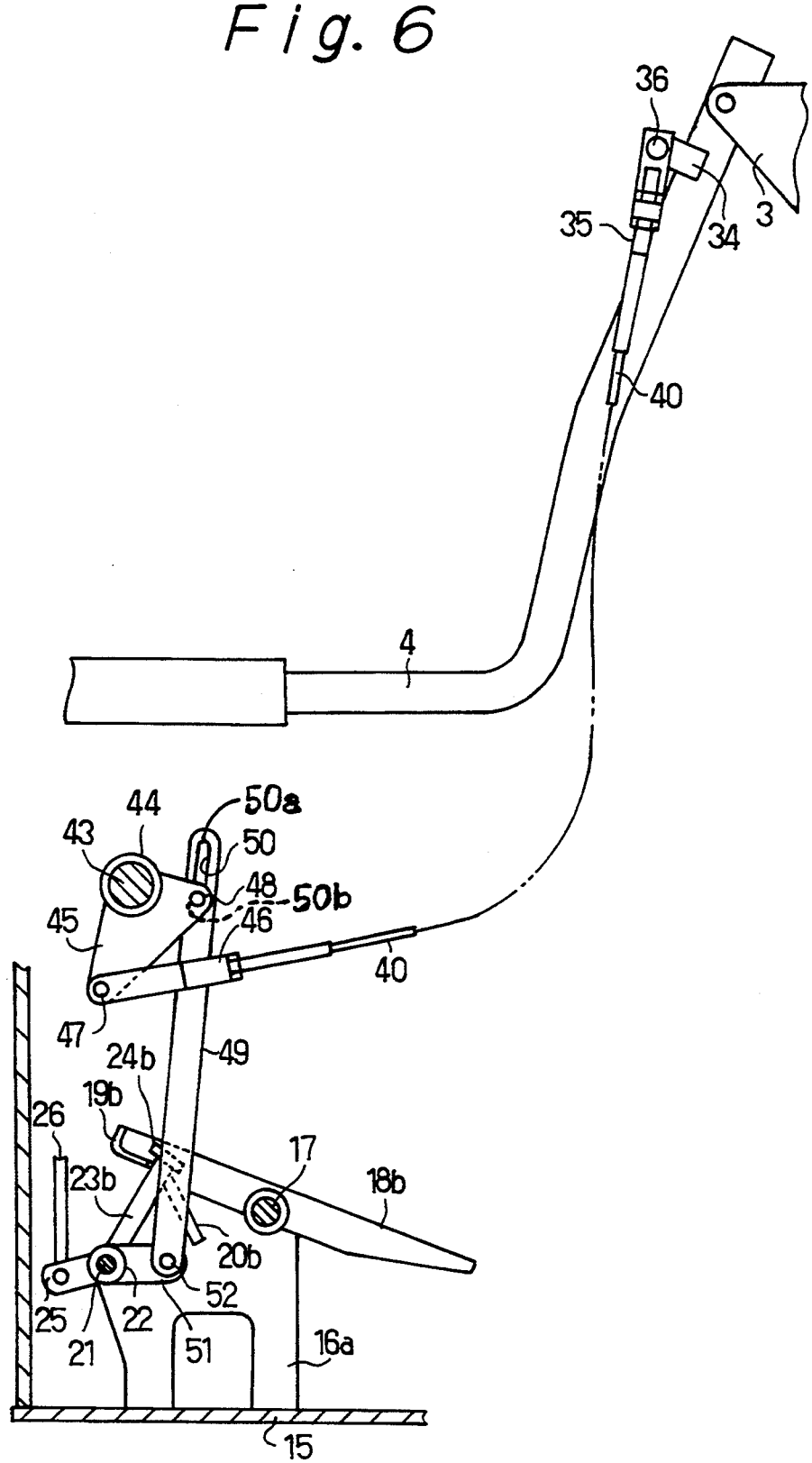
FIG. 6 is an explanatory view showing the foot pedal in a state locked by the engaging pin with the seat bar turned to the operating position.

Subsequently, as shown in FIGS. 2, 3 and 6, the operating lever 26 moves down and the control lever 25 turns counterclockwise on the center of the pipe 22 and the fixed shaft 21 from the position indicated by the two-dot chain line in FIG. 2 to the position indicated by the solid line. Such movement turns the engaging pins 23a and 23b counterclockwise on the center of the fixed shaft 21 from the position indicated by the two-dot chain line to the position indicated by the solid line in FIG. 2. Furthermore, the heads 24a and 24b of the engaging pins 23a and 23b are positioned in the respective base ends 19c of the locking plates 19a and 19b, locking the rotation control lever 25 of the foot pedal 18a and 18b. That is, the rotational operation of the engaging pins 23a and 23b can be done independently of the rotation switching operation of the seat bar 4 to the waiting position.

Furthermore, when the operator S, after finishing operation, switches the seat bar 4 from the operating position shown in FIG. 4 to the waiting position shown in FIG. 5 when getting off the operator's seat section 1 through the entrance on the front side of the vehicle, the locking action does not depend on deenergizing of the solenoid 28. If, in this case, either the driving device 27 or the solenoid 28 has a trouble, the rotating lever 45 turns counterclockwise on the center of the support shaft 43 via the control rod 35, wire 40 and control rod 46 when the seat bar 4 is turned upwardly to switch its position. At this time, since the connecting pin 48 connected to the rotating lever 45 is located at the upper end stop 50a of the slot 50 of the rocking link 49 as shown in FIG. 4, the rocking link 49 moves upward. Then, the pipe 22 and the link lever 51 turn counterclockwise on the center of the fixed shaft 21 via the connecting pin 52. Accordingly, the engaging pins 23a and 23b turn counterclockwise on the center of the fixed shaft 21, thus moving the heads 24a and 24b in the base ends 19c of the locking plates 19a and 19b guided by the locking pawls 20a and 20b, respectively, thus forcibly locking the foot pedals 18a and 18b against turning.

When the operator S takes the seat 2 of the operator's seat section 1 again and turns the seat bar 4 downwardly from the waiting position to the restraining position, the set switch 7 and the seat switch 32 are automatically turned on.

With the rotation of the seat bar 4 from the waiting position to the restraining position as shown in FIG. 5, the rotating lever 45 turns clockwise on the center of the support shaft 43 through the control rod 35, wire 40 and control rod 46. Similarly, the connecting pin 48 of the rotating lever 45 turns clockwise on the center of the support shaft 43. The connecting pin 48 slides in the elongated slot 50 of the rocking link 49, to move against the stop 50b formed by the lower end of the slot 50 as shown in FIG. 6. Therefore, since the rocking link 49 does not move downward, the heads 24a and 24b of the engaging pins 23a and 23b remain against the base ends 19c of the locking plates 19a and 19b, thus holding the foot pedals 18a and 18b in the locked state.

When the vehicle H is started with the ignition switch 30 turned on in such a state that the set switch 7 and the seat switch 32 are turned on, the solenoid 28 is driven by the timer circuit 31 and the relay 33.

Then, the operating shaft 61 of the solenoid 28 is withdrawn in the direction indicated by the arrow in FIG. 3. And the link piece 59 connected to the link pin 63 indicated by a solid line in FIG. 3 and the connecting piece 58 turn counterclockwise on the center of the support pin 56 to the position indicated by the two-dot chain line.

Subsequently, the operating lever 26 moves upward to turn the control lever 25 clockwise on the center of the fixed shaft 21 from the position indicated by the solid line to the position indicated by the two-dot chain line, and the engaging pins 23a and 23b turn clockwise on the center of the fixed shaft 21 from the position indicated by the solid line to the position indicated by the two-dot chain line, thereby moving the heads 24a and 24b of the engaging pins 23a and 23b off from the ends 19c of the locking plates 19a and 19b. The link lever 51 also turns clockwise on the center of the fixed shaft 21 from the position indicated by the solid line to the position indicated by the two-dot chain line, thereby moving the rocking link 49 from the state shown in FIG. 6 to the state shown in FIG. 4. Therefore, it is possible to turn or pivot the foot pedals 18a and 18b following these operations.

In the present embodiment as described above, the operator S turns the seat bar 4 from the restraining position to the waiting position when getting off the operator's seat section 1 of the vehicle H, thus moving the rotating lever 45 and raising the rocking link 49 connected to the rotating lever 45 by the connecting pin 48 through the control rod 35, wire 40 and control rod 46. With the upward movement of the rocking link 49, the engaging pins 23a and 23b are turned via the link lever 51 to firmly lock the foot pedals 18a and 18b.

In this case, if the driving device 27 and the solenoid 28 fail to lock the engaging pins 23a and 23b, the seat bar 4 is turned to the waiting position by the operator S, particularly when he gets off the operator's seat section 1 of the vehicle H, so that the engaging pins 23a and 23b can be turned mechanically, thereby firmly locking the foot pedals 18a and 18b.

Furthermore, since the connecting pin 48 of the rotating lever 45 only slides in the slot 50 of the rocking link 49, if the seat bar 4 is accidentally turned from the waiting position to the restraining position, the rocking link 49 is not operated, holding the foot pedals 18a and 18b in the locked state. The solenoid 28 and the driving device 27 become operable to move the operating lever 26 upward only when the ignition switch 30 is turned on after the set switch 7 and the seat switch 32 are placed in their on positions. Then, the engaging pins 23a and 23b are turned by the control lever 25 and the pipe 22, unlocking the foot pedals 18a and 18b to allow the rotation, that is, depression of these pedals.

With this device, the engaging pins 23a and 23b are mechanically turned to forcibly lock the foot pedals 18a and 18b by turning the seat bar 4 from the restraining position to the waiting position, and therefore the foot pedals 18a and 18b are kept locked if accidentally stepped on by the operator S when he gets on or off the operator's seat section 1 of the vehicle H.

In the present embodiment described above, the locking operation of the foot pedals mounted on a shovel loader has been described. In other vehicles, such as in a fork-lift truck, for example, a similar locking effect can be obtained to prevent the vehicle from accidentally starting, by similarly locking the driving movement of the accelerator pedal.

What is claimed is:

1. A foot pedal locking device for a cargo-handling vehicle having a seat for an operator, comprising:
   a restricting means for locking said foot pedal against rotation;
   a detecting means for detecting utilization of said cargo-handling vehicle by an operator, said detecting means comprising electrical means;
   electrically operated operating means for moving said restricting means on the basis of a detection signal from said electrical means of said detecting means to lock or unlock said foot pedal;
   a restraining means switchably interposed between a restraining position where the operator occupying said seat is restrained and a waiting position where the operator is not disturbed from getting on and off the vehicle; and
   a mechanical lock control means for forcibly operating said restricting means independently of said electrically operated operating means responsive to the switching movement of said restraining means between the restraining position and the waiting position to alternately lock or unlock said foot pedal.

2. A foot pedal locking device for a cargo-handling vehicle as defined in claim 1, wherein said detecting means comprises at least one of a set switch for detecting said restraining means in the restraining position, a seat switch for detecting the operator occupying the seat, and an ignition switch.

3. A foot pedal locking device for a cargo-handling vehicle as defined in claim 2, wherein said operating means operates said restricting means to unlock said foot pedal when all said switches of said detecting means output signals indicative of utilization of the cargo-handling vehicle.

4. A foot pedal locking device for a cargo-handling vehicle as defined in claim 1, wherein said operating means includes a driving device having a spring and a solenoid, said solenoid being operated against the bias of said spring in response to a signal from said detecting means for detecting the state of utilization of the cargo-handling vehicle, to actuate said restricting means to unlock said pedal, and whereby when no signal from said detecting means for detecting the state of utilization of the cargo-handling vehicle is output from said detecting means, said restricting means is operated by said bias of said spring of said driving device to lock said pedal.

5. A foot pedal locking device for a cargo-handling vehicle as defined in claim 1, wherein said operating means has a delay means which delays outputting for a preset period of time in case no signal is output from said detecting means for detecting the state of utilization of the cargo-handling vehicle.

6. A foot pedal locking device for a cargo-handling vehicle as defined in claim 1, wherein said restraining means is rotatably supported at both ends in the horizontal direction, and is bent at the middle part toward the front of the vehicle, approximately in an L-shape as viewed from the side of the vehicle.

7. A foot pedal locking device for a cargo-handling vehicle as defined in claim 1, wherein said control means includes means enabling said operating means to be unlocked in response to the switching of said restraining means from the waiting position to the restraining position.

8. A foot pedal locking device for a cargo-handling vehicle as defined in claim 7, wherein said lock control means is connected to said restricting means through a movable member having an elongated slot and a connecting pin slidable in said slot, said connecting pin being positioned at one end of said slot by the operation of said restraining means from the restraining position to the waiting position, forcibly moving said member and restricting means to lock said foot pedal against rotation and, further, said connecting pin sliding in said slot to the opposite end thereof by the operation of said restraining means from the waiting position to the restraining position to permit unlocking of said foot pedal by said operating means.

9. A foot pedal locking device for a cargo-handling vehicle as defined in claim 1, wherein said restraining means has a holding means for holding said restraining means steadily in the restraining position or in the waiting position.

10. A foot pedal locking device for a cargo-handling vehicle as defined in claim 1, wherein said restricting means has an engaging pin rotating on the back side of the pedal and a locking member provided on the back of the pedal, said engaging pin positioned for engaging said locking member to lock the pedal against rotation.

11. A shovel loader vehicle having a foot pedal locking device for a cargo-handling vehicle as defined in claim 1 and an entrance on the front side of the vehicle.

12. A foot pedal locking device according to claim 10, wherein said locking member is bifurcated to provide a pair of laterally spaced-apart pawls for receiving said engaging pin therebetween from one end thereof, and means defining an opposite base end between said pawls for abutting said engaging pin when locking said pedal against rotation, said engaging pin having a laterally projecting head thereon, and said locking member being spaced away from the underside of said foot pedal to accomodate said projecting head adjacent to said base end between said pawls, and said pair of pawls being bent to extend angularly away from the underside of said pedal towards said one end of the locking member for guiding said engaging pin projecting head into abutting engagement with said base end.

13. A foot pedal locking device for a cargo-handling vehicle as defined in claim 1, wherein said lock control means includes link means connected to said restricting means for locking or unlocking said foot pedal, and a wire connected to said link means and to said restraining means for operating said restricting means responsive to said movement of said restraining means.

14. A locking device for locking at least one pedal in a cargo-handling vehicle having a seat for an operator, comprising a seat bar mounted on said vehicle for movement with respect to said seat between a restraining position for restraining a seated operator and a waiting position away from said seat; electrically operated pedal locking apparatus comprising a normally open seat switch closable responsive to an operator sitting on said seat, a normally open seat bar detection switch closable responsive to said seat bar being in said restraining position, a pedal engaging pin mounted on said vehicle for movement into and out of pedal-locking engagement with each said pedal, and a driving device for driving each said pedal engaging pin into and out of pedal-locking engagement with its said pedal, said driving device comprising a spring and linkage normally urging and retaining each said pedal engaging pin in locking engagement with its said pedal, and a solenoid actuatable when said seat switch and said seat bar detection switch are closed for urging said linkage against the bias of said spring to move each said pedal engaging pin out of locking engagement with its said pedal; and lock control apparatus connected to said driving device linkage for moving each said pedal engaging pin against any urging of said solenoid and into locking engagement with its said pedal when said seat bar is in its said waiting position.

15. A locking device according to claim 14, wherein said vehicle has a plurality of said pedals and a corresponding plurality of said pedal engaging pins, and said locking device is operable to move all of said pedal engaging pins simultaneously into and out of said pedal-locking engagement with said pedals.

16. A locking device according to claim 14, wherein said electrically operated pedal locking apparatus comprises an electric circuit having said seat switch, said seat bar detection switch and said solenoid therein, and further having therein a timer circuit for nullifying a momentary opening of said seat switch.

17. A locking device according to claim 14, wherein said driving device linkage includes a rotatable shaft mounted on said vehicle, each of said pedal engaging pins being attached to said rotatable shaft, said shaft being rotatable in opposite directions alternately responsive to said urging of said spring and said opposite urging of said solenoid, respectively, for moving each of said pedal engaging pins into and out of said pedal-locking engagement; and said lock control apparatus comprises a lever attached to said rotatable shaft and having a free end, a link pivotally connected at one of its ends to said free end of said lever, a rigid wire attached at one of its ends to said seat bar, and a lost-motion device connected between the opposite end of said wire and the opposite end of said link, whereby moving said seat bar to said restraining position permits operation of said driving device and moving of said seat bar to said waiting position moves each of said pedal engaging pins into locking engagement with its said pedal against any urging of said solenoid.

18. A locking device according to claim 17, wherein said lost-motion device comprises a lever mounted for rotatable movement on said vehicle and having a pair of outer ends, said opposite end of said wire being connected to one of said lever outer ends, the other of said lever outer ends having a lost-motion connection to said opposite end of said link.

19. A locking device according to claim 18, wherein said lost-motion connection comprises a pair of spaced-apart stops on one of said other outer end of said lever and said opposite end of said link, and a pin projecting from the other of said other outer end of said lever and said opposite end of said link and disposed for movement alternately between the respective of said pair of stops.

20. A locking lever according to claim 18, wherein said other outer end of said lever has an elongated slot therein, said slot having an upper end and a lower end which together provide said pair of spaced-apart stops, said pin projecting from said opposite end of said link.

* * * * *

UNITED STATES PATENT AND TRADEMARK OFFICE
CERTIFICATE OF CORRECTION

PATENT NO. : 5,383,532
DATED : January 24, 1995
INVENTOR(S) : M. Shonai et al

It is certified that error appears in the above-indentified patent and that said Letters Patent is hereby corrected as shown below:

Column 3, line 45 after "pin" insert --8--.

Column 6, line 50, after "bar" insert --4--; line 51 after "lines," delete period ".".

Signed and Sealed this

First Day of August, 1995

Attest:

BRUCE LEHMAN

*Attesting Officer*  *Commissioner of Patents and Trademarks*